(12) United States Patent
Michishita

(10) Patent No.: US 9,445,228 B2
(45) Date of Patent: Sep. 13, 2016

(54) MOBILE DEVICE MONITOR SYSTEM

(71) Applicant: Nobuhiro Michishita, Los Altos, CA (US)

(72) Inventor: Nobuhiro Michishita, Los Altos, CA (US)

(*) Notice: Subject to any disclaimer, the term of this patent is extended or adjusted under 35 U.S.C. 154(b) by 0 days.

(21) Appl. No.: 14/616,678

(22) Filed: Feb. 7, 2015

(65) Prior Publication Data

US 2016/0014555 A1 Jan. 14, 2016

Related U.S. Application Data

(60) Provisional application No. 62/023,876, filed on Jul. 12, 2014.

(51) Int. Cl.
*G08B 1/08* (2006.01)
*H04W 4/02* (2009.01)
*G06F 21/00* (2013.01)
*G06F 21/88* (2013.01)
*H04M 1/60* (2006.01)

(52) U.S. Cl.
CPC ............... *H04W 4/02* (2013.01); *G06F 21/00* (2013.01); *G06F 21/88* (2013.01); *H04W 4/028* (2013.01); *G06F 2221/2111* (2013.01); *H04M 1/6075* (2013.01)

(58) Field of Classification Search
CPC .................................. H04W 4/02; G08B 1/00
USPC ............... 340/539.32, 539.13, 539.15, 10.1, 340/539.23, 457; 455/456.1, 41.2
See application file for complete search history.

(56) References Cited

U.S. PATENT DOCUMENTS

| | | | |
|---|---|---|---|
| 8,750,832 B2 * | 6/2014 | Wuergler | H04W 4/046 455/41.1 |
| 2013/0278415 A1 * | 10/2013 | Morgan, Jr. | H04W 4/046 340/539.13 |
| 2014/0031010 A1 | 1/2014 | Wuergler et al. | |
| 2014/0213301 A1 * | 7/2014 | Evans | H04W 4/023 455/456.3 |

OTHER PUBLICATIONS

Chao, R.M. et al, Data Hiding Scheme Using Covering Codes in Haltone Images Based on Error Diffusion , 2008.

* cited by examiner

*Primary Examiner* — Phung Nguyen
(74) *Attorney, Agent, or Firm* — Douglas L. Weller

(57) ABSTRACT

A system detects absence of a mobile device. The system includes a mobile device detection system that detects mobile devices in communication range of the mobile device detection system. Expected device logic compares mobile devices detected in communication range of the mobile device detection system with a list of mobile devices expected to be presence during a check of mobile devices in communication range of the mobile device detection system. A notification system notifies a user when at least one mobile device in list of mobile devices expected to be presence during a check of mobile devices in communication range of the mobile device detection system is not in communication range of the mobile device detection system.

20 Claims, 9 Drawing Sheets

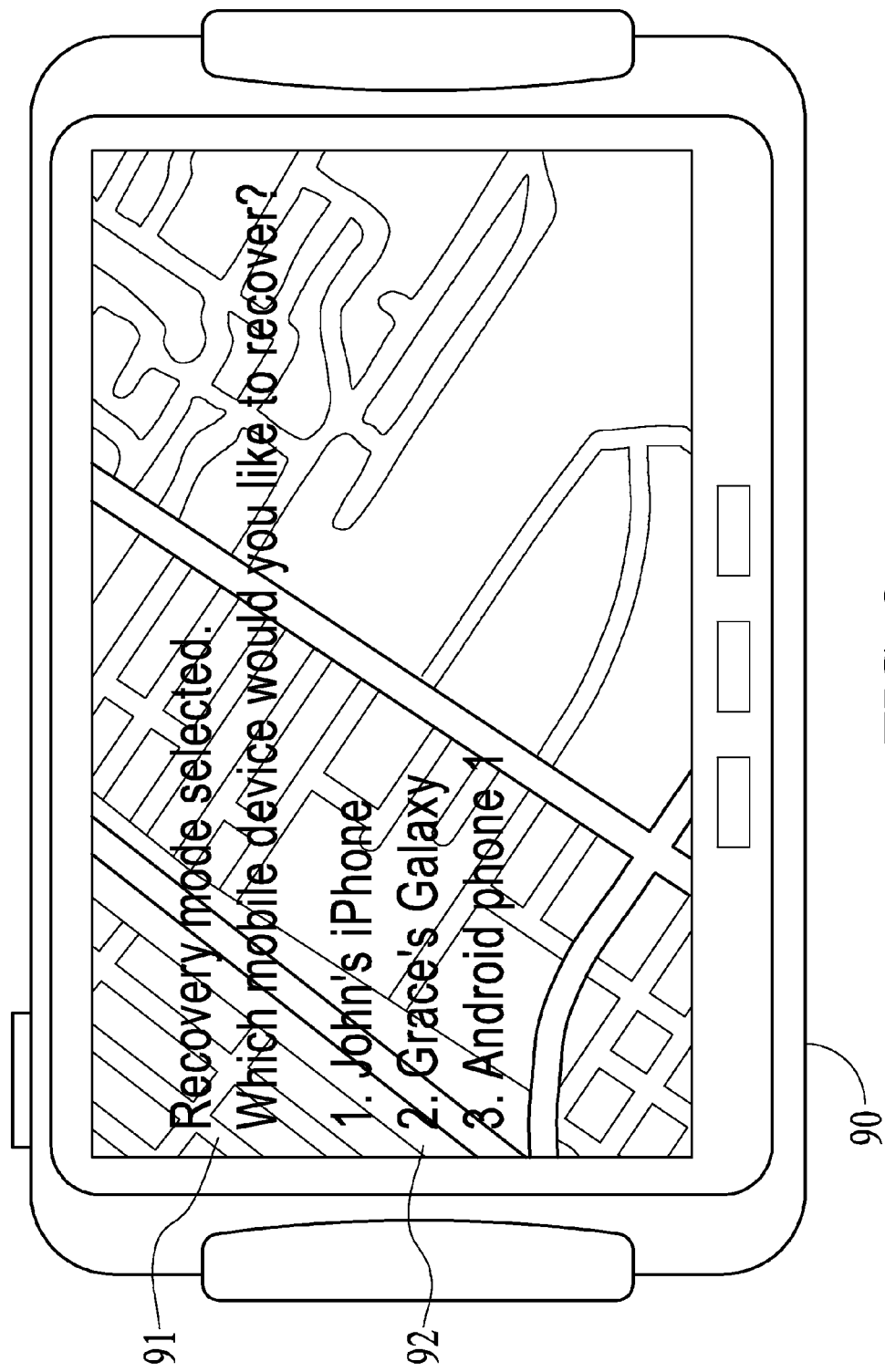

MOBILE DEVICE MONITOR SYSTEM

BACKGROUND

Many people carry and use personal mobile devices such as cellular phones, smart phones, portable audio players, tablets, laptop computers and so on. Many find that they inadvertently left behind their device at the location of a previous engagement. If several locations have been recently visited, it may be difficult to remember or even ascertain at which location the device was left. This can lead to great inconvenience, loss of property, loss of business opportunities, missed communications or any combination of these.

BRIEF DESCRIPTION OF THE DRAWINGS

FIG. 9 shows an example of a visual communication generated in a recovery mode by a system that detects the absence of mobile devices in accordance with another implementation.

DESCRIPTION OF THE EMBODIMENT

Figure 1:
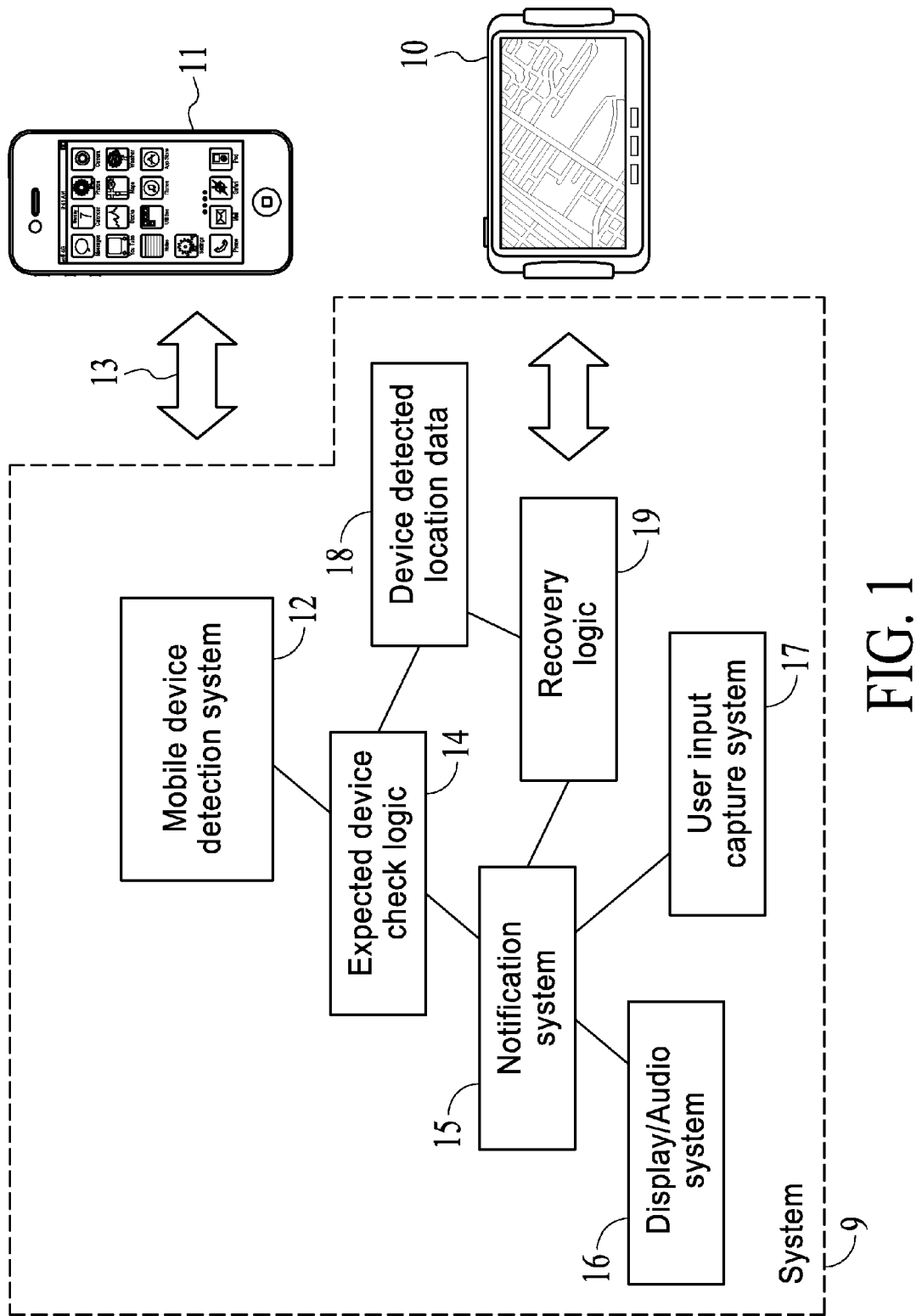
FIG. 1 is a simplified block diagram of a system that detects the absence of mobile devices in accordance with an implementation.

FIG. 1 is a simplified block diagram of a system 9 that detects the absence of mobile devices. For example, system 9 is a stand-alone system that can be used when travelling in a vehicle such as an automobile, truck, motorcycle or recreational vehicle. The stand-alone system can include dedicated hardware that implements the functionality of the stand-alone system. For example, the stand-alone system can be implemented with a small form factor making it ideal to clip on a belt or put in a purse.

For example, the standalone system is either battery operated or run with 12V/24V DC power or USB power supplied from a vehicle. For example, the stand-alone system is located inside of the vehicle within wireless range of the operator, in a location where the operator can see and operate the stand alone system. For example, the standalone system is implemented on a portable (aftermarket) GPS navigation system. Alternatively, the standalone system is implemented as part of a radar detector, a hands free headsets/speaker, or is simply a stand-alone "mobile device monitoring system".

Alternatively, the stand-alone system can be implemented within a device typically carried by a person such as a key chain, wallet, glasses, a wearable device such as Google Glass and so on. The stand-alone system can even be implemented in credit card size hardware, but in such a device it is a challenge to obtain sufficient speaker volume to generate a warning that will be noticed if, for example the device is stored in a wallet or pocket. If the device containing the system is lost, the system is of limited value. The primary value of the system is to detect the absence of other devices. Also, to be successful, the stand-alone system should detect absence of a mobile phone and must be within proximity of driver so driver can hear or see warning when another mobile phone is not detected.

Alternatively, system 9 is a fully integrated system implemented on a vehicle audio/display system. In such an implementation, for example, there is a two way-interface communication between system 9 and elements of the vehicle such as a GPS navigation system, a driver profile memory system, an audio system and a display system.

Alternatively, system 9 is a small battery operated that can be attached to key chain or fit in pocket. A minimum size system may include, for example, only a few buttons used for accepting input from driver, a vibration warning system and/or simple speaker that produces an audio warning output. Such a portable system can be configured (for example, to register and delete mobile device from a list of registered devices), for example, by connecting to personal computer, computer tablet, smart phone, or other computing device.

A mobile device detect system 12 is used to detect the presence of a mobile device, represented in FIG. 1 by a Smartphone 11. This is done, for example, through a communication link 13. For example, communication link 13 can be implemented using a wireless technology such as a wireless local area network (WiFi) or a short range wireless interconnection such as compatible with the Bluetooth standard or another standard. Alternatively, a wired link such as a universal serial bus (USB) link can be used.

For example, mobile device detect system 12 includes hardware and software that implements and uses a Bluetooth standard to search for mobile devices which have been previously paired with mobile device detect system 12. Alternatively, mobile device detect system 12 uses WiFi to search for mobile devices which have been previously connected with mobile device detect system 12.

Expected device check logic 14 checks the mobile device(s) detected by mobile device detect system 12 against a list of mobile devices expected to be presence during a check. For example, the list of mobile devices expected to be presence during a check is input by a user using a user input capture system 17. Alternatively, mobile devices on the list can be paired with mobile device detect system 12. Alternatively, a list of mobile devices can be downloaded from another device to system 9 or in some other way entered into system 9.

For example, system 9 includes a 12-volt male cigarette lighter socket plug or some other power plug that allows system 9 to be connected to the power of a vehicle. When the vehicle is turned on, this triggers expected device check logic 14 to make a check comparing the expected devices verses the mobile devices detected by mobile device detection system 12.

When expected device check logic 14 detects that an expected mobile device is not present, a notification system 15 uses display/audio system 16 to notify a user that the expected mobile device is not present. For example, display/audio system 16 provides an audio notification delivered through a speaker. The audio notification can be a tone, or a series of tones. The tone pattern can vary depending upon which expected mobile device is not present. Alternatively, or in addition, display/audio system 16 provides a voice notification to indicate to the user a mobile device is missing, or can identify for the user exactly which mobile device is not present. Alternatively, or in addition, display/audio system 16 can use vibrations to notify that a mobile device is missing. When system 9 is fully integrated within a vehicle, a car seat may be vibrated, for example, to provide notifications to a user.

Alternative to or in addition to an audio notification or a vibration notification, display/audio system 16 delivers a visual notification indicating which mobile device is not present. This visual notification can be delivered on a display incorporated in system 9 or on some other display that system 9 is in communication with. For example, the display can be part of an entertainment system, navigation system or electronic dashboard in the vehicle.

Visual notification, for example, is greater than current Bluetooth enabled vehicle hands free phone systems that show, for example, a "white" Bluetooth mark when a paired device is not connected, and show "blue" Bluetooth mark when the device is connected. This color change is not enough to inform a driver that the paired device is not in proximity when the driver intended but forgot to bring the device.

More proactive, or active notification, is described herein that requires, for example, positive input from a driver to clear a warning.

System 9 can also include device detected location data 18 and recovery logic 19. When an expected mobile device is not present, recovery logic 19 uses device detected location data 18 to locate the missing mobile device. For example, the device detected location data 18 can include records stored that indicate a last location where the missing device was detected as present by mobile device detection system 12. Alternatively, recovery logic 19 can determine current location of the missing mobile device using a tracking application such as the Prey app available from Prey, Inc. loaded on the mobile device to locate the mobile device. Alternatively, a GPS tracking service such as Accu-Tracking can be used.

Recovery logic 19 can be used to direct the user to the location of a missing mobile device. For example, recovery logic 19 can load the location of the missing mobile device to a mapping enabled device represented by mapping display 10. For example, mapping display 10 can be on a dedicated GPS device, a navigation system on a vehicle or on a screen of a device that includes system 9. The mapping display 10 can show the location of the missing mobile device and/or provide directions to the missing mobile device.

Figure 2:
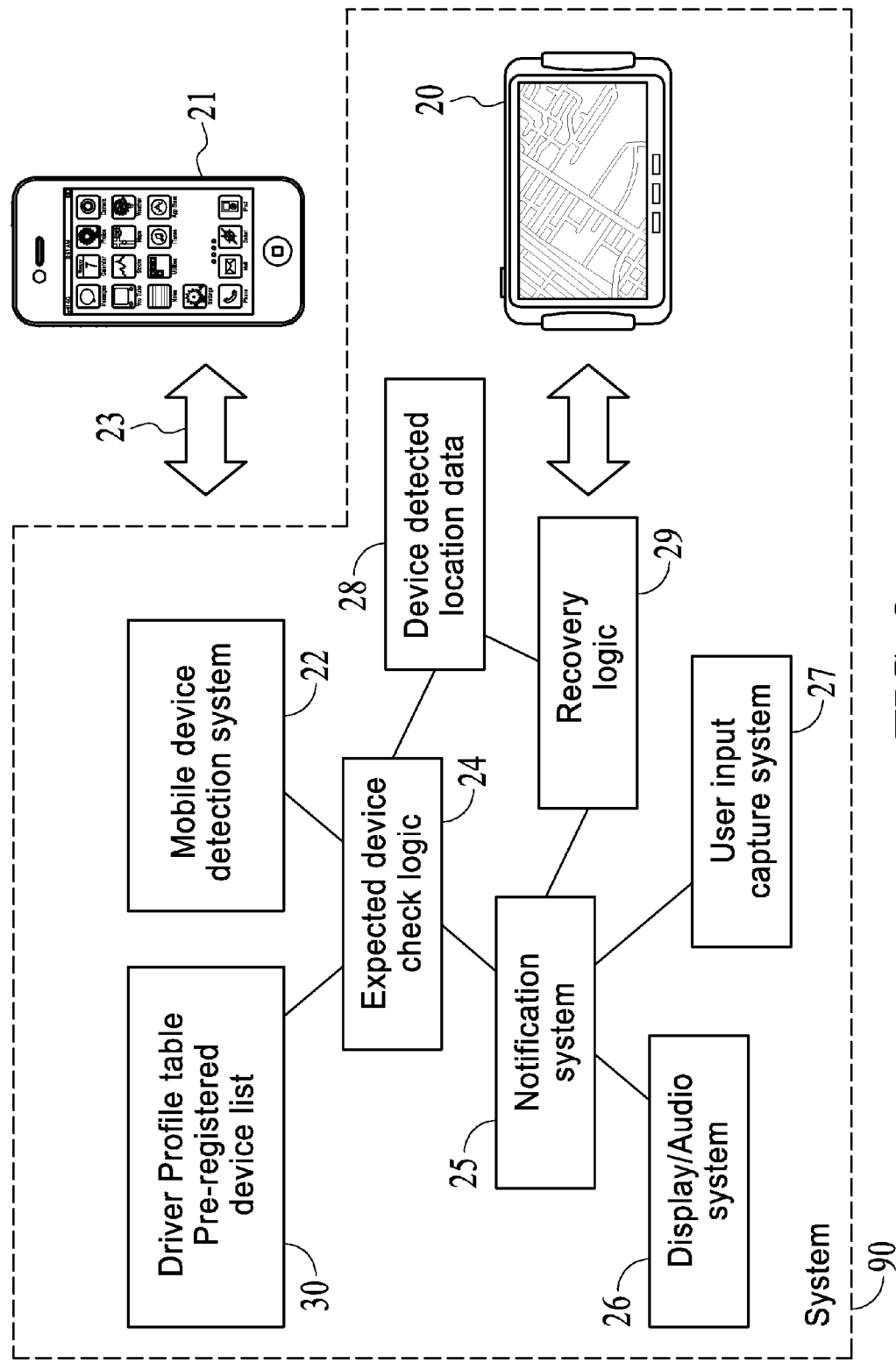
FIG. 2 is a simplified block diagram of a system that detects the absence of mobile devices in accordance with another implementation.

FIG. 2 is a simplified block diagram of a system 90 that detects the absence of mobile devices. For example, system 90 is integrated as part of a vehicle such as an automobile, truck, motorcycle or recreational vehicle.

A mobile device detect system 22 is used to detect the presence of a mobile device, represented in FIG. 2 by a Smartphone 21. This is done, for example, through use of a communication link 23. For example, communication link 23 can be implemented using a wireless technology such as WiFi or a short range wireless interconnection compatible with the Bluetooth standard. Alternatively, a wired link such as a USB link can be used.

For example, mobile device detect system 22 uses a short range wireless interconnection compatible with the Bluetooth standard to search for mobile devices which have been previously paired with mobile device detect system 22. Alternatively, mobile device detect system 22 uses WiFi to search for mobile devices which have been previously connected with mobile device detect system 22.

Expected device check logic 24 checks the mobile device(s) detected by mobile device detect system 22 against driver profile table pre-registered device list 30. For example, user input capture system 27 is used to turn off a triggered warning. For example, driver profile table pre-registered device list 30 is populated by pairing mobile devices with mobile device detect system 22. Alternatively, driver profile table pre-registered device list 30 can be downloaded from another device to system 90.

For example, when the vehicle is turned on, this triggers expected device check logic 24 to make a check comparing driver profile table pre-registered device list 30 with the mobile devices detected by mobile device detection system 22.

When expected device check logic 24 detects that an expected mobile device is not present, a notification system 25 uses display/audio system 26 to notify a user that the expected mobile device is not present. For example, display/audio system 26 provides an audio notification delivered through a speaker in the vehicle's sound system. The audio notification can be a tone, or a series of tones. The tone pattern can vary depending upon which expected mobile device is not present. Alternatively, or in addition, display/audio system 26 provides a voice notification to indicate to the user a mobile device is missing, or can identify for the user exactly which mobile device is not present.

Alternative to or in addition to an audio notification, display/audio system 26 delivers a visual notification indicating which mobile device is not present. This visual notification can be delivered on a display in the vehicle. For example, the display can be part of an entertainment system, navigation system or electronic dashboard in the vehicle.

System 90 can also include device detected location data 28 and recovery logic 29. When an expected mobile device is not present, recovery logic 29 uses device detected location data 28 to locate the missing mobile device. For example, the device detected location data 28 can include records that indicate a last location where the missing device was detected as present by mobile device detection system 22. Alternatively, recovery logic 29 can determine current location of the missing mobile device using a tracking application such as the Prey app available from Prey, Inc. loaded on the mobile device to locate the mobile device. Alternatively, a GPS tracking service such as AccuTracking can be used.

Recovery logic 29 can be used to direct the user to the location of a missing mobile device. For example, recovery logic 29 can load the location of the missing mobile device to a vehicle navigation system 20. Vehicle navigation system 20 can show the location of the missing mobile device and/or provide directions to the missing mobile device.

For example, FIG. 9 shows an example of a recovery display 91 on vehicle navigation system 20, allowing a user to select which missing mobile device to recover. In the example, three mobile devices are listed in list 92. These three mobile devices are mobile devices previously registered in driver profile table pre-registered device list 30, but not currently detected by mobile device detection system 22 upon vehicle start-up. In recovery mode, the user can select one of the three listed phones to recover. Upon selection of one of the three listed mobile devices, recovery logic 29 loads location of the selected mobile device, determined as described above, and directs the user to the location.

Figure 3:
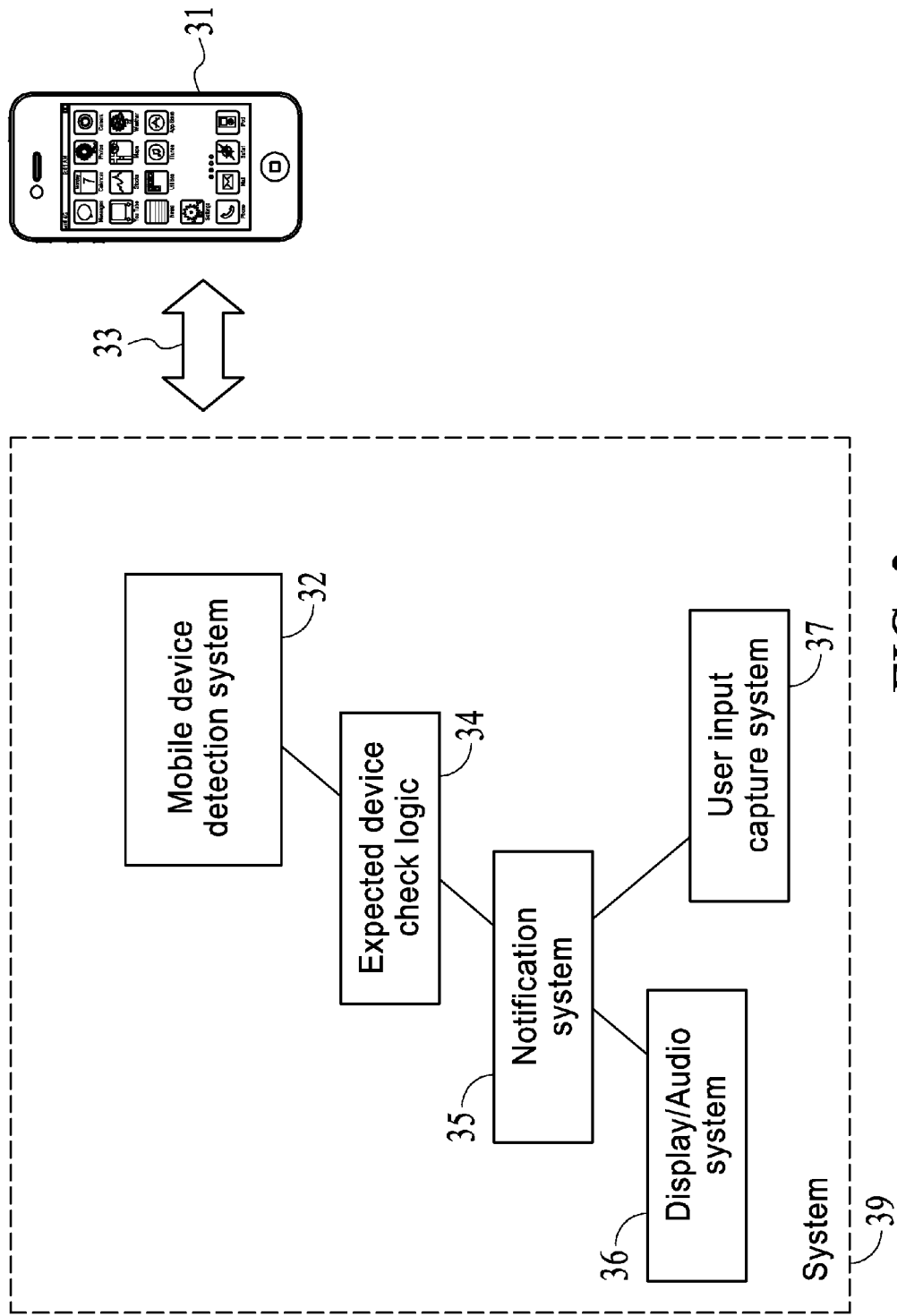
FIG. 3 is a simplified block diagram of a system that detects the absence of mobile devices in accordance with another implementation.

FIG. 3 is a simplified block diagram of a system 39 that detects the absence of mobile devices. For example, system 39 is simplified system available on a public transportation system or to a bicycle rider or walker. For example, the stand-alone system can be implemented with a small form factor making it ideal to clip on a belt or put in a purse. Alternative, the stand-alone system can be implemented within a mobile device such as a cellular phone, a smart phone, a tablet, or a portable computer that detects when other mobile devices are not present.

A mobile device detect system 32 is used to detect the presence of a mobile device, represented in FIG. 3 by a Smartphone 31. This is done, for example, through a communication link 33. For example, communication link 33 can be implemented using a wireless technology such as WiFi or a short range wireless interconnection compatible with the Bluetooth standard. Alternatively, a wired link such as a USB link can be used.

For example, mobile device detect system 32 uses Bluetooth to search for mobile devices that have been previously paired with mobile device detect system 32. Alternatively, mobile device detect system 32 uses WiFi to search for mobile devices which have been previously connected with mobile device detect system 32.

Expected device check logic 34 checks the mobile device(s) detected by mobile device detect system against a list of mobile devices expected to be presence during a check. For example, user input capture system 37 is used to turn off a triggered warning. For example, the list is populated by pairing mobile devices with mobile device detect system 32. Alternatively, the list can be downloaded from another device to system 39.

When expected device check logic 34 detects that an expected mobile device is not present, a notification system 35 uses display/audio system 36 to notify a user that the expected mobile device is not present. For example, display/audio system 36 provides an audio notification delivered through a speaker. The audio notification can be a tone, or a series of tones. The tone pattern can vary depending upon which expected mobile device is not present. Alternatively, or in addition, display/audio system 36 provides a voice notification to indicate to the user a mobile device is missing, or can identify for the user exactly which mobile device is not present.

Alternative to or in addition to an audio notification, display/audio system 36 delivers a visual notification indicating which mobile device is not present. This visual notification can be delivered on a display of system 39.

Figure 4:
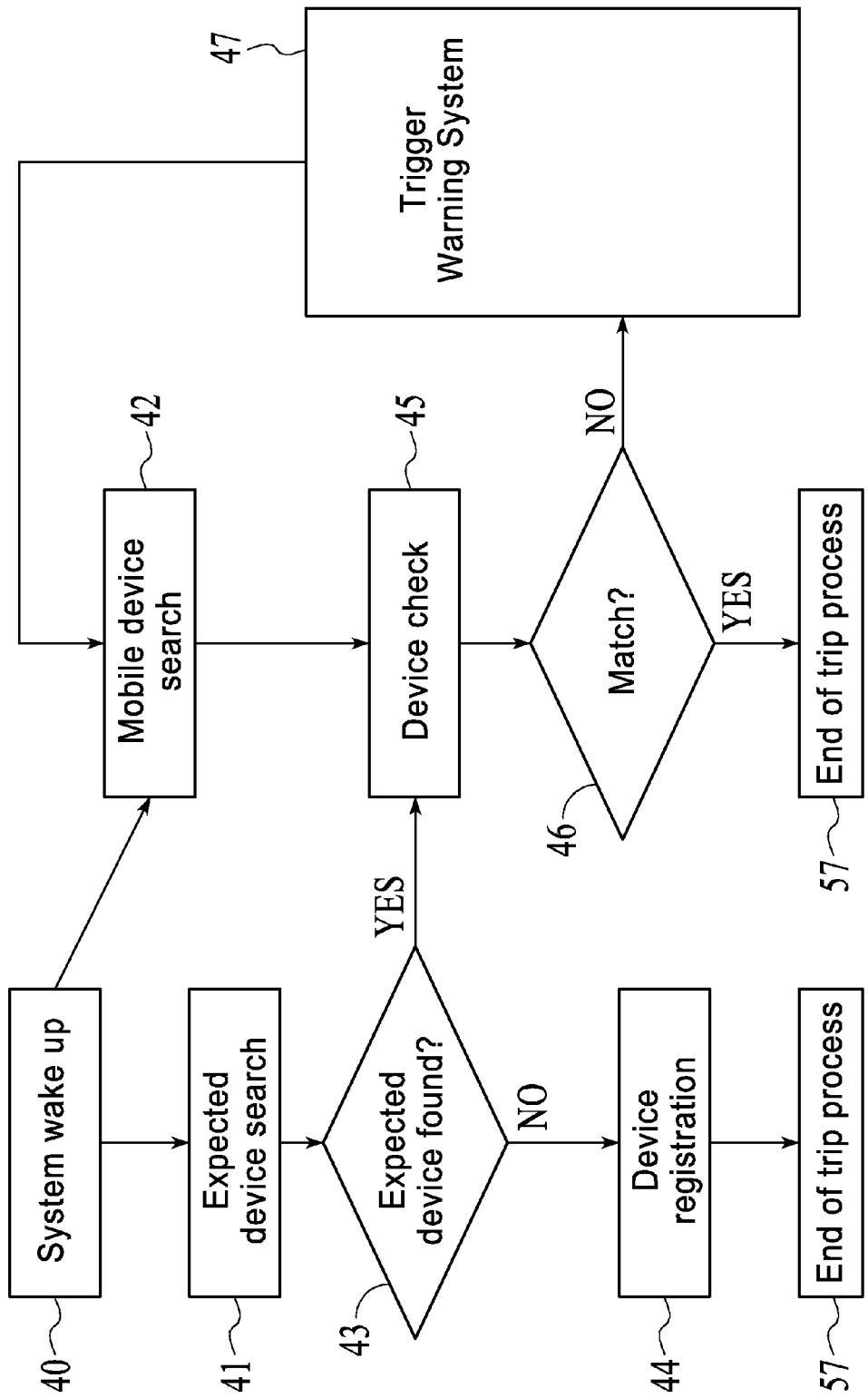
FIG. 4, FIG. 5 and FIG. 6 show logic flow for a system that detects the absence of mobile devices in accordance with an implementation.
Figure 5:
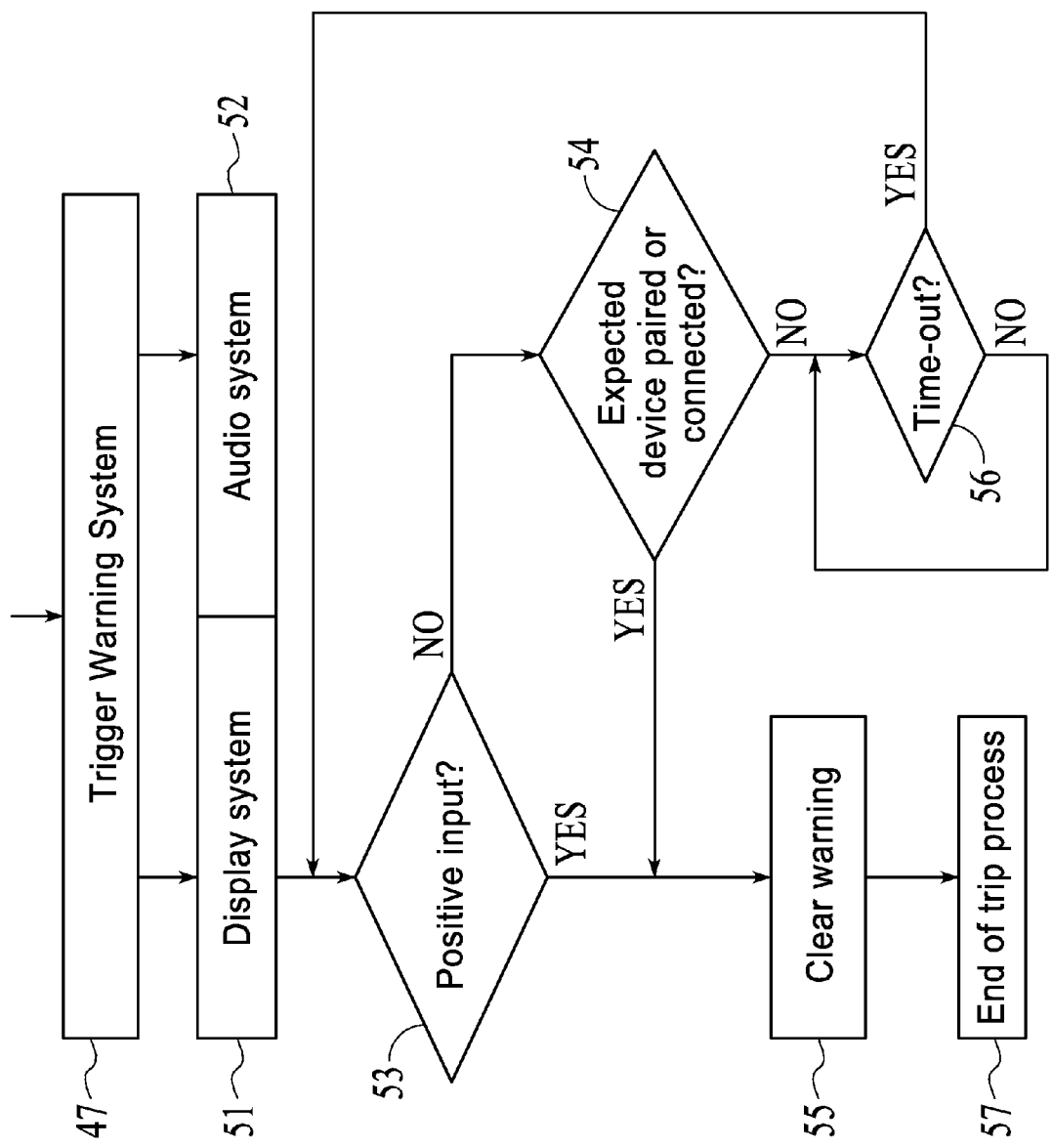
Figure 6:
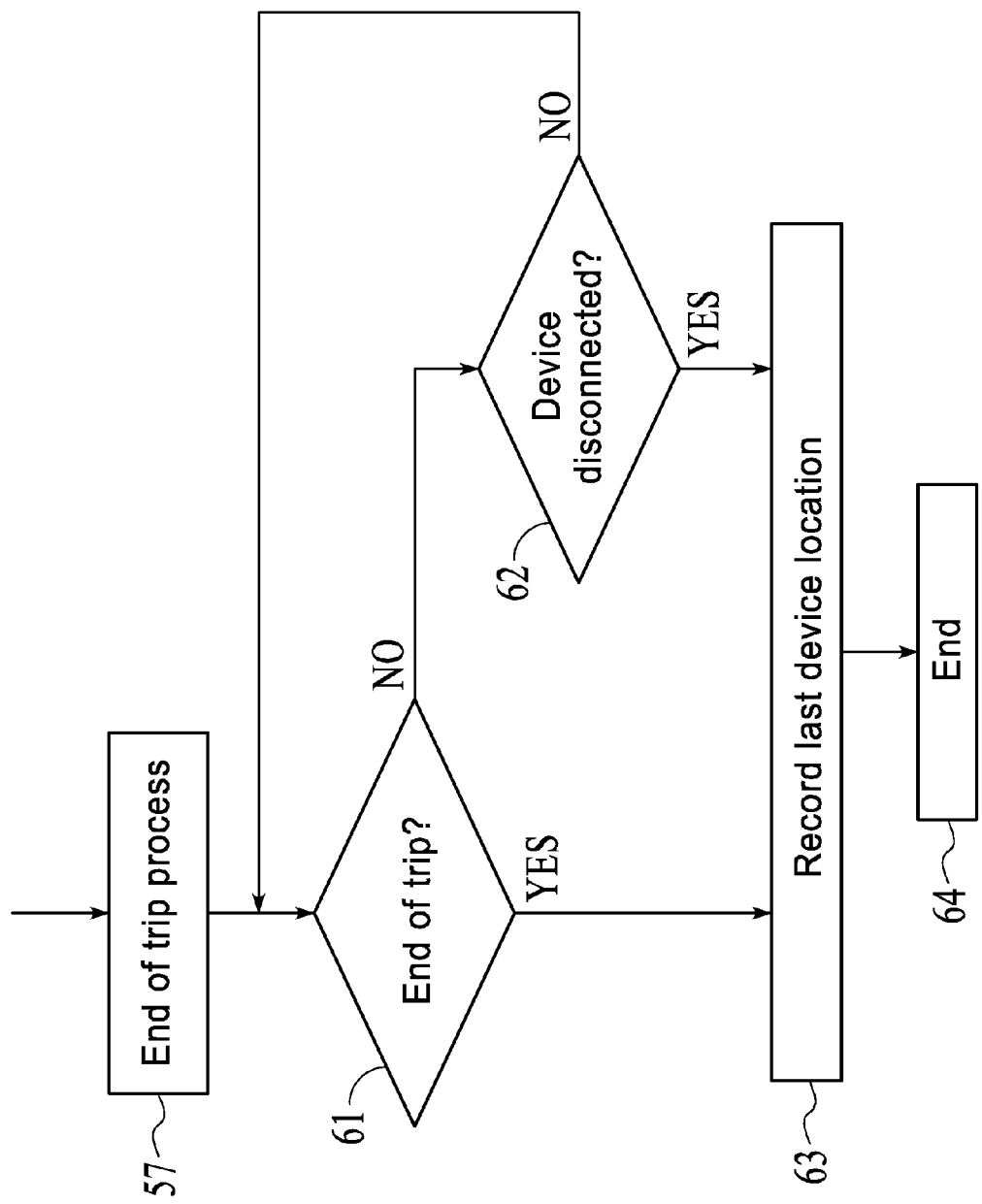

FIG. 4, FIG. 5 and FIG. 6 show logic flow for system 90 shown in FIG. 2. Logic flow is similar for system 9 shown in FIG. 1 and system 39 shown in FIG. 3.

In a block 40, system 90 (shown in FIG. 2) wakes up. This occurs, for example, when the vehicle electrical system is turned on, when keyless entry is enabled, when a remote key fob is pressed or when a mobile device is detected.

In a block 42, mobile device detection system 22 (shown in FIG. 2) performs a mobile device search. This is done, for example, by scanning wireless and wired connections to detect a mobile device. In a block 41, expected device check logic 24 (shown in FIG. 2) performs an expected device search. In a block 43, expected device check logic 24 determines whether an expected device is found in driver profile table pre-registered device list 30. If there is no expected device listed in driver profile table pre-registered device list 30, device registration 44 is enabled by user input capture system 27 to allow a user to register a mobile device to be listed in driver profile table pre-registered device list 30. System 20 enters end of trip process block 57.

If in block 43, expected device check logic 24 finds an expected device listed in driver profile table pre-registered device list 30, in a block 45, expected device check logic 24 determines whether the expected device listed in driver profile table pre-registered device list 30 was found by mobile device detection system 22 in the mobile device search performed in block 42. If there is a match for all the expected device listed in driver profile table pre-registered device list 30, system 20 enters end of trip process block 57.

If in block 46 any of the expected device listed in driver profile table pre-registered device list 30 is missing, in a block 47, notification system 25 is triggered. Logic flow will then return to mobile device search block 42. This loop for notification of a missing device will continue the missing device is located or until a user acknowledgement (positive user input), a timer expires, the system is turned off or some other stopping event occurs.

In a display system block 51 and an audio system block 52, display/audio system 26 notifies a user, such as a driver or passenger in the vehicle, that an expected mobile device cannot be found in range of mobile device detection system 22. For example, display/audio system 26, as represented by audio system block 52 in FIG. 5, provides an audio notification delivered through a speaker in the vehicle's sound system. The audio notification can be a tone, or a series of tones. The tone pattern can vary depending upon which expected mobile device is not present. Alternatively, or in addition, display/audio system 26, as represented by audio system block 52 in FIG. 5, provides a voice notification to indicate to the user a mobile device is missing, or can identify for the user exactly which mobile device is not present.

Figure 7:
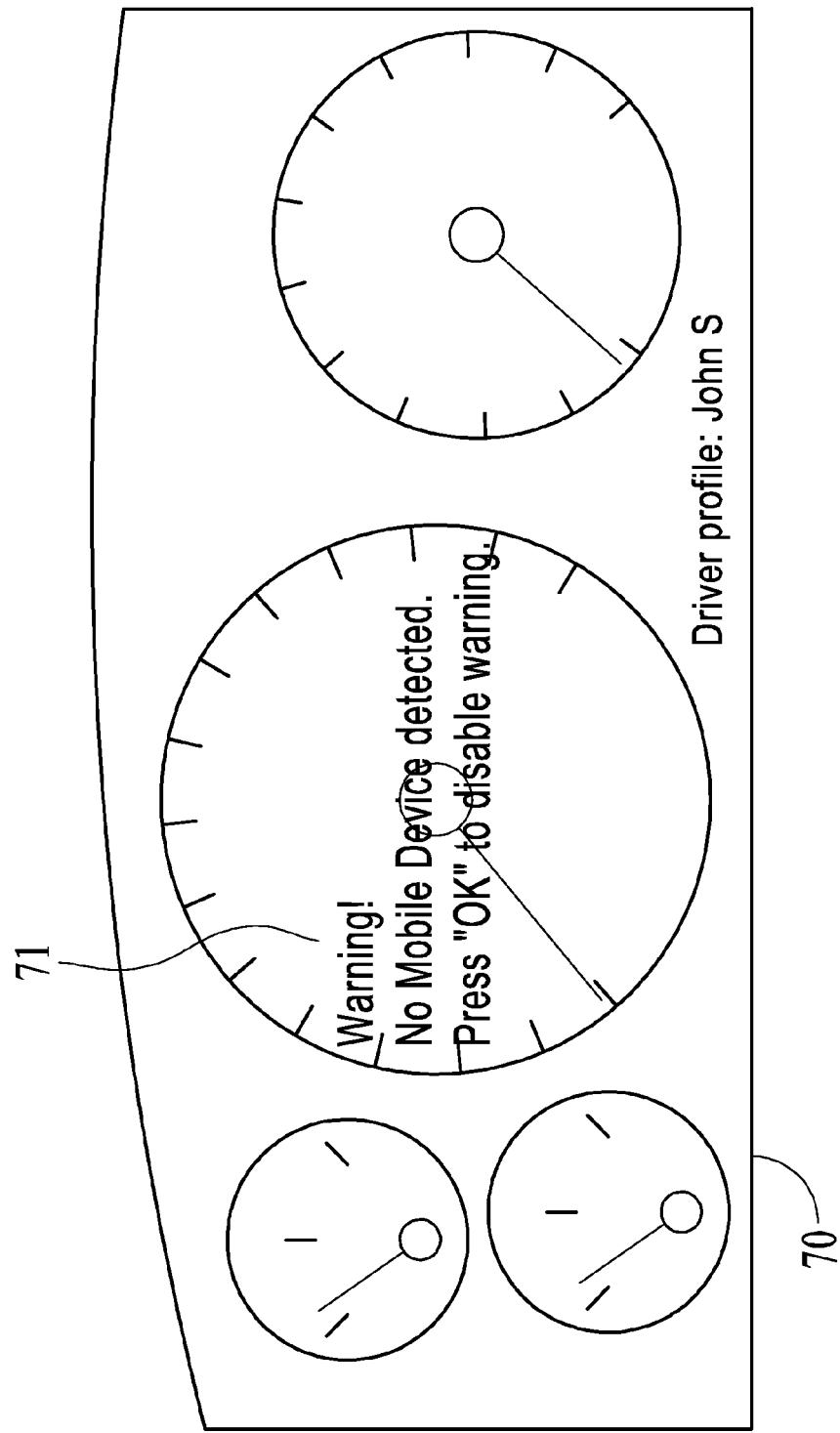
FIG. 7 shows an example of a visual warning generated by a system that detects the absence of mobile devices in accordance with an implementation.
Figure 8:
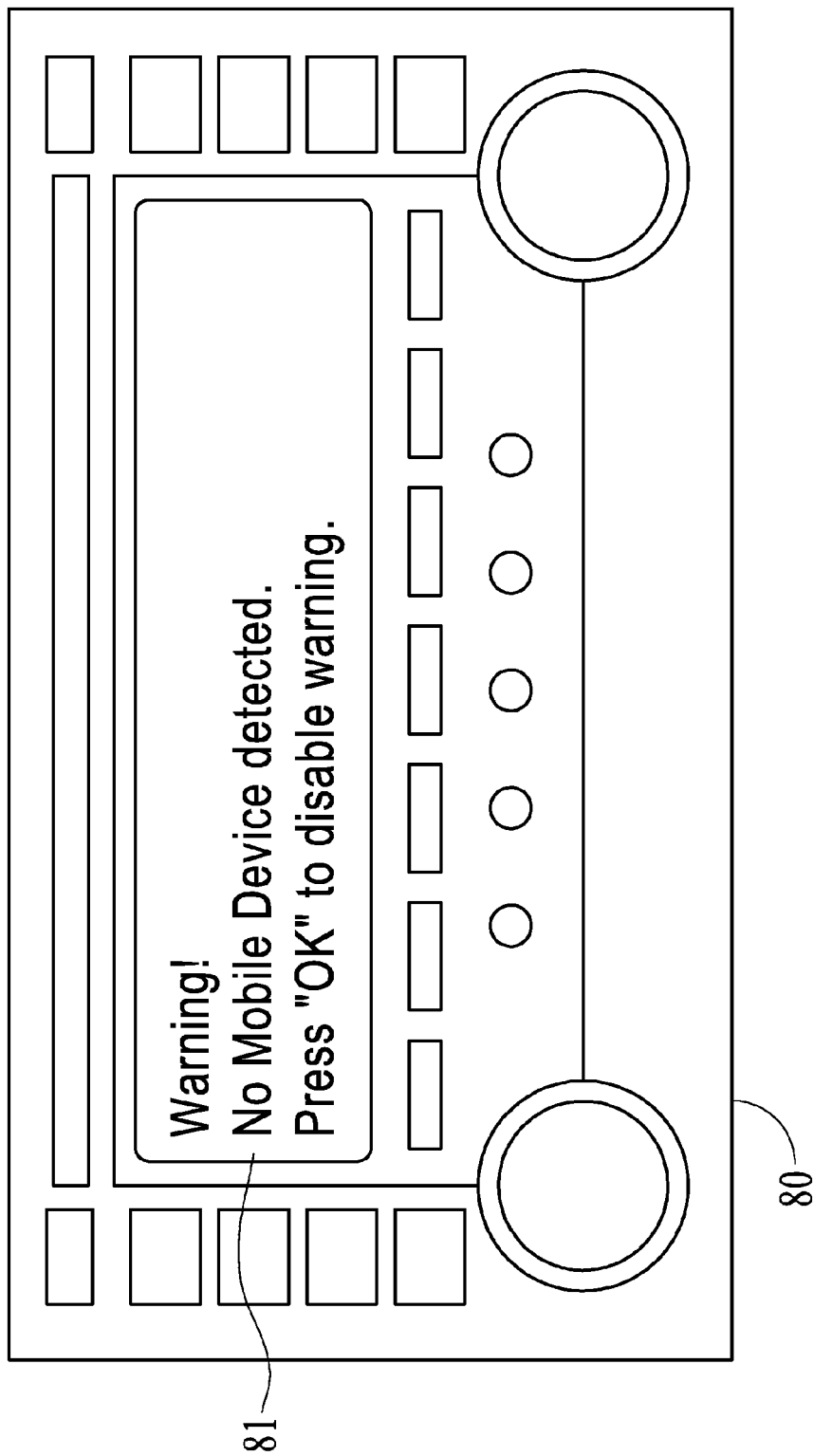
FIG. 8 shows an example of a visual warning generated by a system that detects the absence of mobile devices in accordance with another implementation.

Alternative to or in addition to an audio notification, display/audio system 26, as represented by display system block 51 in FIG. 5, delivers a visual notification indicating which mobile device is not present. This visual notification can be delivered on a display in the vehicle. For example, the display can be part of an entertainment system, navigation system or electronic dashboard in the vehicle. Such a visual notification is illustrated in FIG. 7, by a message 71 flashed across an electronic dashboard 70. Likewise, such a visual notification is illustrated in FIG. 8, by a message 81 flashed across a vehicle entertainment system display 80.

In a block 53, a check is made as to whether a driver (or other operator of system 9) has selected to turn off the audio, vibration and/or visual notification. This is done for example, by pressing a button, making a selection on a touch screen, using a voice command, etc. to provide an input to user input capture system 27. This positive input indicates the driver/operator is aware that the mobile device is not present. Once the user gives positive input to turn off the audio, vibration and/or visual notification, in a block 55, the audio, vibration and/or visual notification is cleared. System 20 enters end of trip process block 57.

If the user delays positive input to turn off the audio, vibration and/or visual notification, in a block 54, notification system 25 checks if the missing expected device has been located. If not, in a block 56, notification system 25 (Shown in FIG. 2) waits for a time out of the audio, vibration and/or visual notification. Upon a time-out of the audio, vibration and/or visual notification, in block 53, a check is again made as to whether a user has selected to turn off the audio, vibration and/or visual notification. If in block 54, notification system 25 determines that the missing expected device has been located, in a block 55, the audio, vibration and/or visual notification is cleared. System 20 enters end of trip process block 57.

As shown in FIG. 6, form end of trip process block 57, in a block 61, system 90 checks if the end of the trip has been reached. For example, the end of the trip is reached when the vehicle electrical system is off, the door is opened, a paired device is disconnected or a navigated journey destination has been reached. If the end of the trip has not been reached, in a block 62, a check is made to see if any mobile device in driver profile table pre-registered device list 30 has been disconnected. If not, in block 61, system 90 again checks if the end of the trip has been reached.

If in block 62, any mobile device in driver profile table pre-registered device list 30 has been disconnected, in a block 63, the location is recorded as the last known location of the disconnected device. Likewise, if in block 61 it is determined it is the end of the trip, in block 63, a current location is recorded as the last known location of any mobile devices still detected as being in communication range of the mobile device detection system 22.

Also useful for elderly person or patient living alone.

Warning system is installed at one or multiple locations (entrance, bathroom, bedroom, kitchen) within a home of subject person ((elderly person, person with chronic medical condition). The system reports the events such as device out of range, device found in range, to pre-registered person or monitoring organization (guardian).

Guardian knows, if subject person is moving within home, left home, came back home, approximate location within home, how long the person stays at that location, so potential emergency situation can be detected soon.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A system that detects absence of a mobile device, comprising:
    a mobile device detection system that detects mobile devices in communication range of the mobile device detection system, wherein communication range is based on proximate physical location with respect to the mobile device detection system;
    expected device logic that compares mobile devices detected in communication range of the mobile device detection system with a list of mobile devices expected to be present during a check of mobile devices in communication range of the mobile device detection system; and,
    a notification system that notifies a user when at least one mobile device in the list of mobile devices expected to be present during a check of mobile devices in communication range of the mobile device detection system is not in communication range of the mobile device detection system, the notification system requiring positive user input to clear a notification.

2. A system as in claim 1, additionally comprising:
    a display/audio system used by the notification system to provide audio, vibration or visual notifications when at least one mobile device in the list of mobile devices expected to be present during a check of mobile devices in communication range of the mobile device detection system is not in communication range of the mobile device detection system.

3. A system as in claim 2, wherein the display/audio system provides a voice notification when at least one mobile device in the list of mobile devices expected to be present during a check of mobile devices in communication range of the mobile device detection system is not in communication range of the mobile device detection system.

4. A system as in claim 2, wherein the display/audio system provides a visual notification when at least one mobile device in the list of mobile devices expected to be present during a check of mobile devices in communication range of the mobile device detection system is not in communication range of the mobile device detection system.

5. A system as in claim 1, additionally comprising:
    a user input capture system that is used to input the list of mobile devices expected to be present during a check of mobile devices in communication range of the mobile device detection system.

6. A system as in claim 1, additionally comprising:
    a driver profile table pre-registered device list used to store the list of mobile devices expected to be present during a check of mobile devices in communication range of the mobile device detection system.

7. A system as in claim 1, additionally comprising:
    device detected location data that indicates an expected location of mobile devices within the list of mobile devices expected to be present during a check of mobile devices in communication range of the mobile device detection system.

8. A system as in claim 7, additionally comprising:
    recovery logic that uses the device detected location data to locate the missing mobile device.

9. A system as in claim 8 wherein the recovery logic uses GPS capability to direct a user to an expected location of a missing mobile device.

10. A system as in claim 7 wherein the device detected location data includes records that indicate a last location where the missing device was detected as present by the mobile device detection system.

11. A system as in claim 7 wherein the device detected location data includes data obtained from a tracking program that tracks locations of a mobile device.

12. A method that detects absence of a mobile device, comprising:
    detecting mobile devices in communication range of a mobile device detection system upon powering up an electrical system of a vehicle, wherein being in communication range indicates physical proximity to the mobile device detection system;
    comparing mobile devices detected in communication range of the mobile device detection system with a list of mobile devices expected to be present during a check of mobile devices in communication range of the mobile device detection system;
    notifying a user when at least one mobile device in the list of mobile devices expected to be present during a check of mobile devices in communication range of the mobile device detection system is not in communication range of the mobile device detection system; and,
    recording a current location as a last known location of a current location is recorded as a last known location of any mobile devices still detected as being in communication range of the mobile device detection system.

13. A method as in claim 12, additionally comprising:
    providing audio, vibration or visual notifications when at least one mobile device in the list of mobile devices expected to be present during a check of mobile devices in communication range of the mobile device detection system is not in communication range of the mobile device detection system.

14. A method as in claim 12, additionally comprising: providing a voice notification when at least one mobile device in the list of mobile devices expected to be present during a check of mobile devices in communication range of the mobile device detection system is not in communication range of the mobile device detection system.

15. A method as in claim 12, additionally comprising: providing a visual notification when at least one mobile device in the list of mobile devices expected to be present during a check of mobile devices in communication range of the mobile device detection system is not in communication range of the mobile device detection system.

16. A method as in claim 12, additionally comprising: performing device registration to allow a user to register a mobile device to input mobile devices into the list of mobile devices expected to be present during a check of mobile devices in communication range of the mobile device detection system.

17. A method as in claim 12, additionally comprising: device detected location data that indicates an expected location of mobile devices within the list of mobile devices expected to be present during a check of mobile devices in communication range of the mobile device detection system.

18. A method as in claim 12, additionally comprising: notifying the user includes requiring positive user input to clear a notification.

19. A vehicle, comprising:
a system that detects absence of a mobile device, the system comprising:
 a mobile device detection system that detects mobile devices in communication range of the mobile device detection system, wherein being in communication range indicates physical proximity to the mobile device detection system;
 expected device logic that compares mobile devices detected in communication range of the mobile device detection system with a list of mobile devices expected to be present during a check of mobile devices in communication range of the mobile device detection system;
 a notification system that notifies a user when at least one mobile device in the list of mobile devices expected to be present during a check of mobile devices in communication range of the mobile device detection system is not in communication range of the mobile device detection system;
 device detected location data that indicates an expected location of mobile devices within the list of mobile devices expected to be present during a check of mobile devices in communication range of the mobile device detection system; and,
 recovery logic that uses the device detected location data to locate the missing mobile device.

20. A vehicle as in claim 19 wherein the notification system requires positive user input to clear a notification.

* * * * *